(12) United States Patent
Liu et al.

(10) Patent No.: US 6,671,497 B2
(45) Date of Patent: Dec. 30, 2003

(54) COMBINATION OF A RADIO WITH AN EARPHONE AND A BALL-POINT PEN

(76) Inventors: Chien-Kuo Liu, 10F, No. 8, Lane 178, Chuang Ching Rd., Taipei (TW); Chen-Hsieh Chung, No. 17, Lane 63, Hsin Jung Rd., Ping Chen City, Tao Yuan Hsien (TW)

( * ) Notice: Subject to any disclaimer, the term of this patent is extended or adjusted under 35 U.S.C. 154(b) by 571 days.

(21) Appl. No.: 09/741,682

(22) Filed: Dec. 18, 2000

(65) Prior Publication Data

US 2002/0006777 A1 Jan. 17, 2002

(51) Int. Cl.[7] ................................................. H04B 1/38
(52) U.S. Cl. ............................. 455/90; 455/66; 455/74; 455/350; 379/433.02
(58) Field of Search .............................. 455/90.1, 90.2, 455/90.3, 575.1, 575.2, 575.3, 575.4, 575.5, 575.6, 550.1, 66.1, 74, 344, 347, 350; 79/433.01, 433.02

(56) References Cited

U.S. PATENT DOCUMENTS

| 4,687,421 A | * | 8/1987 | Cameron et al. ............ 417/296 |
| 4,969,180 A | * | 11/1990 | Watterson et al. .......... 379/56.1 |
| 5,754,645 A | * | 5/1998 | Metroka et al. ........ 379/433.12 |
| 2002/0065114 A1 | * | 5/2002 | Lin ............................. 455/568 |

FOREIGN PATENT DOCUMENTS

GB         2137038 A   *   9/1984   ........... H04B/01/08

* cited by examiner

*Primary Examiner*—Lee Nguyen
*Assistant Examiner*—Minh D. Dao
(74) *Attorney, Agent, or Firm*—Pro-Techtor Inter-National Services

(57) ABSTRACT

A combination of a radio with an earphone and a ball-point pen comprises:

- a lower housing in which a pen core is disposed;
- a hollow upper housing being provided with an upper thread hole and a lower thread hole at the upper end and the lower end thereof, and being provided with an indentation and at least one through holes at the periphery thereof;
- a connecting body for connecting the lower housing to the upper housing;
- a radio circuit having the function of receiving a signal and being disposed inside the upper housing, the circuit being provided with a switch for controlling the volume and the power source of the radio, a reset key and a channel key for adjusting the frequency, and a earphone receptacle, wherein the switch corresponds to the indentation while the reset key and the channel key correspond to the through holes, respectively;
- at least one battery disposed at the upper surface of the connecting body for providing the circuit with power;
- a cover having an earphone socket at the top portion thereof, and fixedly (threadedly) connected to the upper thread hole; and
- a plug of an earphone selectively inserted into the socket for causing the communication of the plug and the receptacle.

5 Claims, 4 Drawing Sheets

COMBINATION OF A RADIO WITH AN EARPHONE AND A BALL-POINT PEN

BACKGROUND OF THE INVENTION

The present invention relates to a ball-point pen, more particularly to a combination of a radio with an earphone and a ball-point pen which functions as a radio and a ball-point pen at the same time.

Normally, a conventional ball-point pen is a portable article on a person which merely functions as a writing instrument and usually placed in the pocket of the user. However, the conventional ball-point pen which functions as a writing instrument was not satisfactory in light of the requirements of a progressive society. In conclusion, there is a demand for the conventional ball-point pen to have at least one additional function thereon. Currently, while there are arrangements where the functions of a clock and a calculator are attached to the conventional ball-point pen, such functions are independent from that of the ball-point pen. Walkman which is carried on a person is currently more popular but the size thereof is large. Furthermore, the carried walkman is merely an independent article that is carried on a person and to combine it with a ball-point pen.

SUMMARY OF THE INVENTION

To provide one additional function on the conventional ball-point pen, an object of the present invention is to provide a combination of a radio with an earphone thereon and a ball-point pen which functions as a radio and a ball-point as desired at the same time.

BRIEF DESCRIPTION OF THE DRAWING

The above objects and advantages of the present invention will become more apparent by the following detailed description of a preferred embodiment thereof in conjunction with the accompanying drawings, in which.

DETAILED DESCRIPTION OF THE PREFERRED EMBODIMENT

Figure 1:
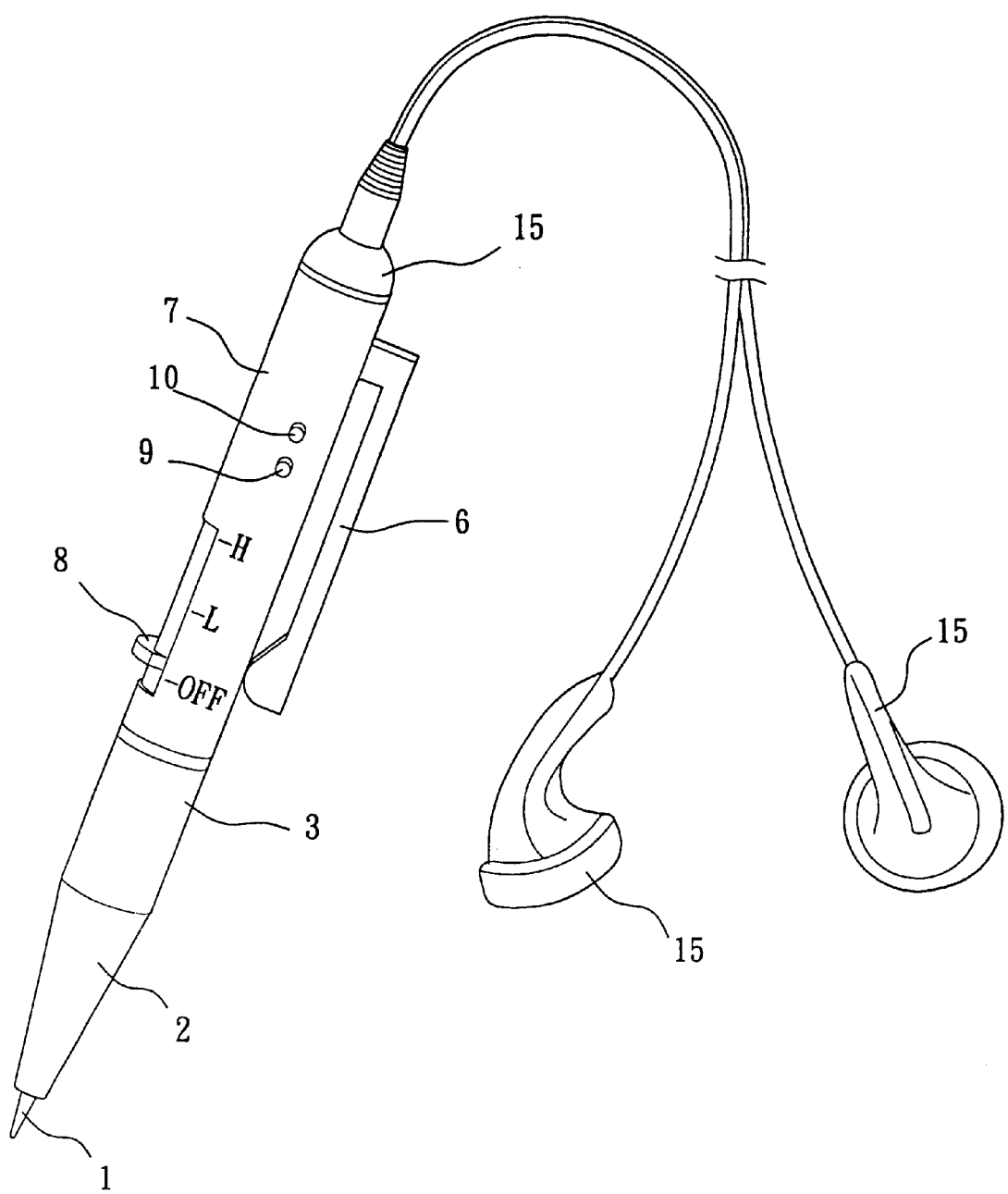
FIG. 1 is a perspective view of a combination of a radio and a ball-point pen according to the present invention.
Figure 2:
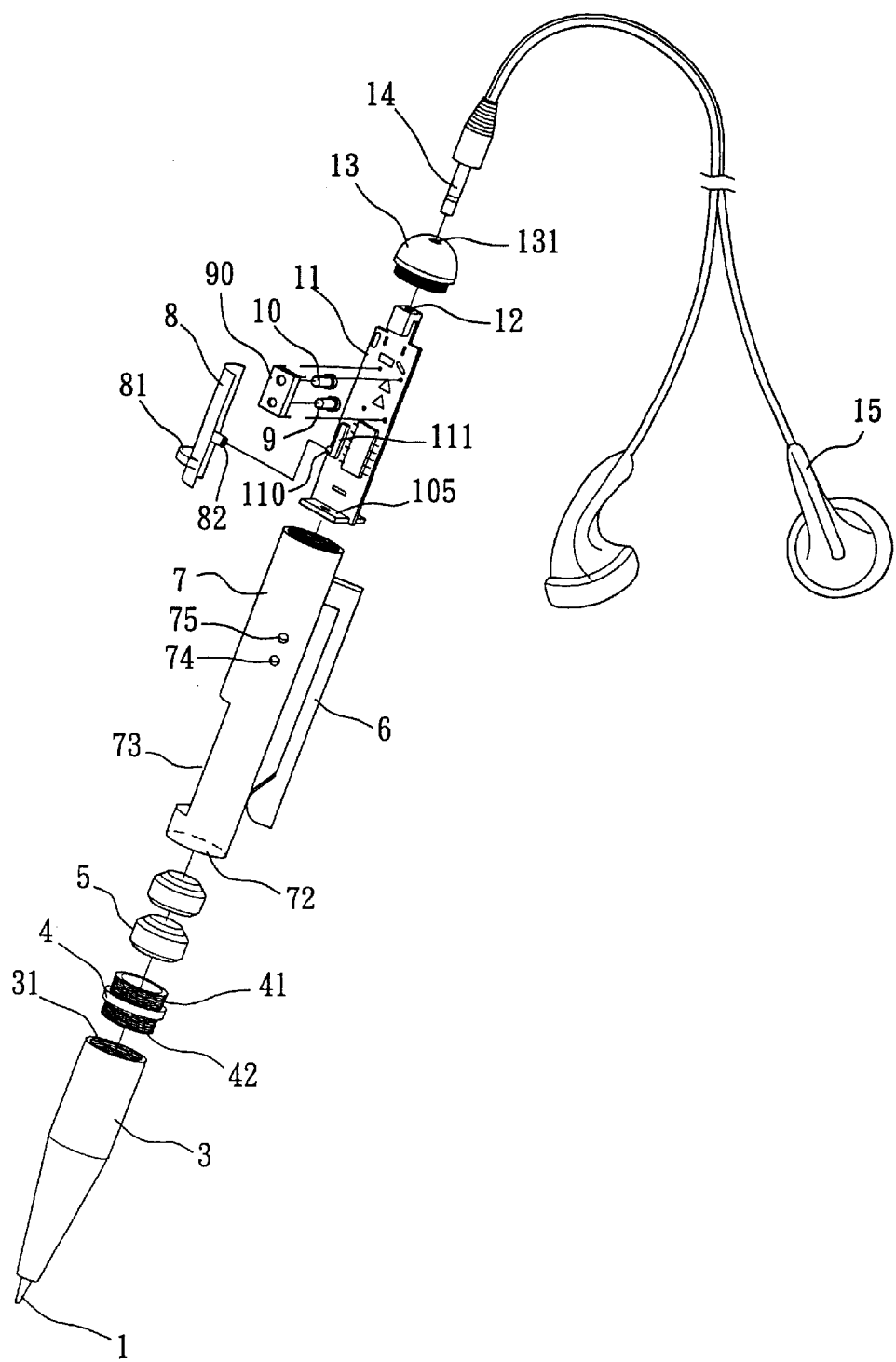
FIG. 2 is an exploded view of a combination of a radio and a ball-point pen according to the present invention.
Figure 3:
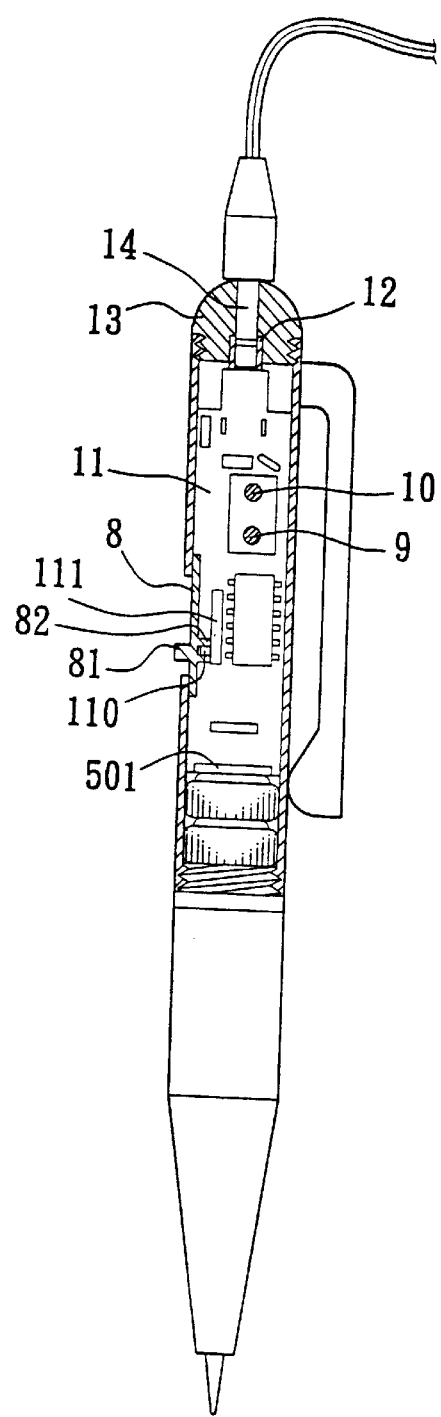
FIG. 3 is a cross-sectional view of a combination of a radio and a ball-point pen according to the present invention.
Figure 4:
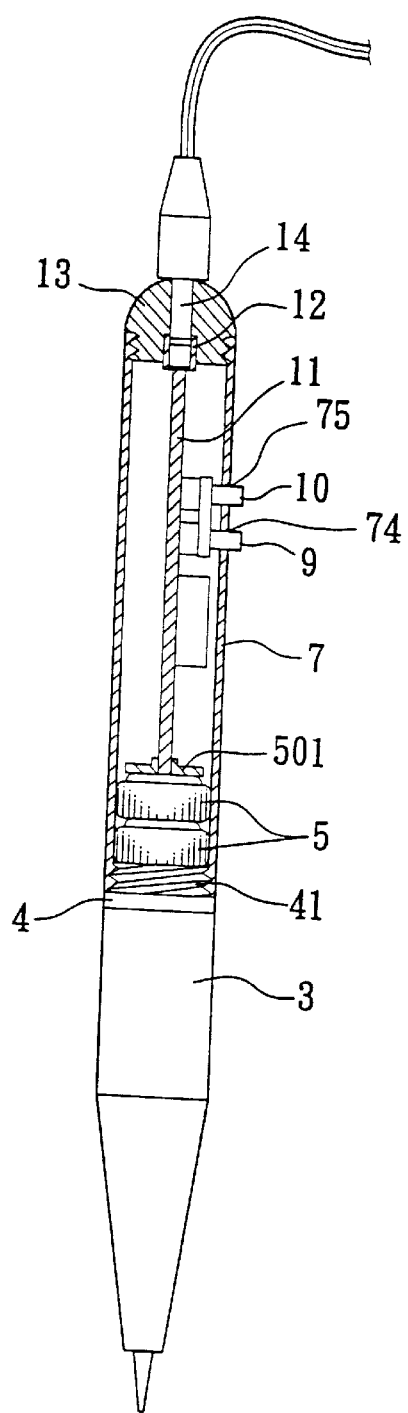
FIG. 4 is a cross-sectional view of a combination of a radio and a ball-point pen according to the present invention.

Referring now to FIGS. 1, 2 and 3, the combination of a radio and a ball-point pen according to the present invention comprises:

a lower housing 3 in which a pen core 1 is disposed;

a hollow upper housing 7 fixedly (threadedly) connected to a cover 13 having an earphone socket 131 at the top portion thereof the housing 7 being provided with an indentation 73 and two through holes 74,75 at the periphery thereof;

a connecting body 4 for connecting the lower housing 3 to the upper housing 7;

a radio circuit 11 having the function of receiving a signal and being disposed inside the upper housing 7, the circuit 11 being provided with a switch 8 for controlling the volume and the power source of the radio, a reset key 9 and a channel key 10 for adjusting the frequency, and a earphone receptacle 12, wherein the switch 8 corresponds to the indentation 73 while the reset key 9 and the channel key 10 correspond to the through holes 74, 75, respectively;

at least one battery 5 disposed at the upper surface of the connecting body 4 for providing the circuit 11 with power;

a plug 14 of an earphone 15 selectively inserted into the socket 131 for causing the communication of the plug 14 and the receptacle 12; wherein, the upper flange and lower flange of the connecting body 4 are provided with an upper thread 41 and a lower thread 42, respectively, for threaded connection with the threaded hole 31 provided at the top portion of the lower housing 3 and the lower threaded hole 72 of the upper housing 7, respectively; wherein the underside of the circuit 11 is further provided with a positive flexible sheet 105 which is in communication with the positive pole of the battery 5 while the negative pole of the battery 5 is in communication with the connecting body 4; and wherein the switch 8 is in the form of an arcuate sheet which can slidably connects with the inner flange of the indentation 73 and is provided with a convex portion 81 and a convex post 82 on the outer surface and inner flange thereof respectively, the convex post 82 being connected to the trigger end 110 of the electric element 111 in the circuit 11 for controlling the volume and power, while the convex portion 81 is exposed from the indentation 73, whereby pressing the convex portion 81 enables the convex post 82 to control the displacement of the trigger end 110 of the electric element 111 for actuating the circuit. If the convex portion 81 is located at the lowermost end (the dead point) in the indentation 73, then the power is in an OFF condition. When the convex portion 81 moves upwardly from the dead point, the power is in an ON condition and the volume is increased. When the convex portion 81 moves downwardly, the volume is reduced. Referring to FIG. 4 the reset key 9 and the channel key 10 are pivotally connected to the frequency modulator 90, respectively. When the reset key 9 is pressed, the channel returns to its normal "zero" position. By pressing the channel key 10, the channel is adjusted anew for selecting a new program.

To use the earphone, the plug 14 is inserted into the socket 131 to cause contact of the plug 14 with the receptacle 12 so that the signal is transmitted to the earphone 15 and turns into the sound heard by the ear of the user. Thus, the user can use the ball-point pen for writing and use the earphone to listen to the radio at the same. time. Of course, if the user only wishes to use the radio function of the ball-point pen, a clip 6 may be clamped on the pocket for supporting the earphone.

As described above, the embodiment according to the present invention utilizes the known radio having functions of volume control, frequency modulator and power switch, etc., which is minimized in size for designing the circuit 11 disposed on the upper housing 7 of the ball-point pen. Therefore, the ball-point pen is provided with an additional radio.

What is claimed is:

1. A combination of a radio with an earphone and a ball-point pen comprising:

a lower housing in which a pen core is disposed;

a hollow upper housing being provided with an upper thread hole and a lower thread hole at the upper end and the lower end thereof, and being provided with an indentation and at least one through holes at the periphery thereof;

a connecting body for connecting the lower housing to the upper housing;

a radio circuit having the function of receiving a signal and being disposed inside the upper housing, the circuit being provided with a switch for controlling the volume and the power source of the radio, a reset key and a channel key for adjusting the frequency, and a earphone receptacle, wherein the switch corresponds to the indentation while the reset key and the channel key correspond to the through holes, respectively;

at least one battery disposed at the upper surface of the connecting body for providing the circuit with power;

a cover having an earphone socket at the top portion thereof, and fixedly (threadedly) connected to the upper thread hole; and a plug of an earphone selectively inserted into the socket for causing the communication of the plug and the receptacle.

2. A combination of a radio with an earphone and a ball-point pen as claimed in claim 1, wherein, the upper flange and lower flange of the connecting body are provided with an upper thread and a lower thread, respectively, for threaded connection with the threaded hole provided at the top portion of the lower housing and the lower threaded hole of the upper housing, respectively.

3. A combination of a radio with an earphone and a ball-point pen as claimed in claim 1, wherein the underside of the circuit is further provided with a positive flexible sheet which is in communication with the positive pole of the battery while the negative pole of the battery is in communication with the connecting body.

4. A combination of a radio with an earphone and a ball-point pen as claimed in claim 1, wherein the switch is in the form of an arcuate sheet which can slidably connects with the inner flange of the indentation and is provided with a convex portion and a convex post on the outer surface and inner flange thereof, respectively, the convex post being connected to the trigger end of the electric element in the circuit for controlling the volume and power; while the convex portion is exposed from the indentation, whereby pressing the convex portion enables the convex post to control the displacement of the trigger end of the electric element for controlling the volume and power.

5. A combination of a radio with an earphone and a ball-point pen as claimed in claim 1, wherein the upper housing including a clip for clamping the pocket of the clothes.

* * * * *